(12) United States Patent
Wei et al.

(10) Patent No.: US 9,807,248 B2
(45) Date of Patent: Oct. 31, 2017

(54) METHOD, SYSTEM, AND ENTITY FOR EXERCISING POLICY CONTROL

(75) Inventors: Weihua Wei, Shenzhen (CN); Xinfa Wang, Shenzhen (CN); Cheng Chen, Shenzhen (CN); Shiyong Tan, Shenzhen (CN); Yan Li, Shenzhen (CN); Shibi Huang, Shenzhen (CN); Peng Zhao, Shenzhen (CN); Yuxin Mao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1660 days.

(21) Appl. No.: 12/604,989

(22) Filed: Oct. 23, 2009

(65) Prior Publication Data

US 2010/0043053 A1 Feb. 18, 2010

Related U.S. Application Data

(63) Continuation of application No. PCT/CN2008/071237, filed on Jun. 6, 2008.

(30) Foreign Application Priority Data

Jun. 15, 2007 (CN) .......................... 2007 1 0111366

(51) Int. Cl.
*H04M 15/00* (2006.01)
*H04L 12/801* (2013.01)
(Continued)

(52) U.S. Cl.
CPC ........ *H04M 15/66* (2013.01); *H04L 12/1407* (2013.01); *H04L 47/10* (2013.01);
(Continued)

(58) Field of Classification Search
CPC .......... H04L 47/10; H04L 47/14; H04L 47/20; H04M 15/66; H04W 16/02; G06Q 20/14
(Continued)

(56) References Cited

U.S. PATENT DOCUMENTS

2005/0245272 A1 11/2005 Spaur et al.
2006/0050711 A1 3/2006 Lialiamou et al.
(Continued)

FOREIGN PATENT DOCUMENTS

CN 1669295 A 9/2005
CN 1829145 A 9/2006
(Continued)

OTHER PUBLICATIONS

3rd Generation Partnership Project: Technical Specification Group Services and System Aspects; Policy and Charging Control Architecture (Release 7) Global System for Mobile Communications. Mar. 2007.
(Continued)

*Primary Examiner* — Steven Kim
(74) *Attorney, Agent, or Firm* — Brinks Gilson & Lione (57) ABSTRACT

A method and a system for exercising policy control, a policy and charging enforcement function (PCEF), and a policy control and charging rules function (PCRF) are provided, which can solve the problem that no policy control can be exercised over application service flows without an application function (AF). The method includes of the following steps: a PCRF receiving information about an application event sent by a PCEF; and the PCRF generating a control policy for a service flow of the application according to the information about the application event, and delivering the control policy to the PCEF. In the present invention, the PCEF sends the obtained information about the application event to the PCRF, so that even when no AF (Continued)

is involved, the PCRF can still generate a control policy according to policy contexts including the information about the application event and the like, so as to exercise an effective policy control over the QoS guarantee, charging and gating of the service flow, thus meeting the requirements of exercising the policy control over data applications with no AF being involved.

7 Claims, 6 Drawing Sheets (51) Int. Cl.
H04L 12/813 (2013.01)
H04L 12/859 (2013.01)
H04L 12/14 (2006.01)

(52) U.S. Cl.
CPC .............. *H04L 47/14* (2013.01); *H04L 47/20* (2013.01); *H04L 47/2475* (2013.01)

(58) Field of Classification Search
USPC ............................... 726/1; 370/229; 465/406
See application file for complete search history.

(56) References Cited

U.S. PATENT DOCUMENTS

| 2007/0070891 | A1  |  3/2007 | Zheng |
| 2008/0013545 | A1* |  1/2008 | Ono et al. ............... 370/395.21 |
| 2008/0046963 | A1  |  2/2008 | Grayson et al. |
| 2008/0229385 | A1* |  9/2008 | Feder et al. ...................... 726/1 |
| 2008/0271113 | A1  | 10/2008 | Belling |
| 2009/0037999 | A1* |  2/2009 | Anderson et al. .............. 726/12 |
| 2010/0040047 | A1* |  2/2010 | Castellanos Zamora et al. ............................. 370/352 |
| 2010/0121960 | A1* |  5/2010 | Baniel et al. ................. 709/228 |

FOREIGN PATENT DOCUMENTS

| CN | 1909514   | A | 2/2007 |
| CN | 1925420   | A | 3/2007 |
| CN | 1968139   | A | 5/2007 |
| CN | 101325780 | B | 7/2010 |
| JP | 2004236030 | A | 8/2004 |

OTHER PUBLICATIONS

3rd Generation Partnership Project: Technical Specification Group Core Network and Terminals; Policy and Charging Control over Gx Reference Point (Release 7) Global System for Mobile Communications. Mar. 2007.

Written Opinion of the International Searching Authority issued in corresponding PCT Application No. PCT/CN2008/071237; dated Sep. 18, 2008.

Supplementary European Search Report issued in corresponding European Patent Application No. EP 08 757 648.4; dated Feb. 19, 2010.

Office Action issued in corresponding European Patent Application No. 08 757 648.4; dated Jun. 15, 2010.

"3rd Generation Partnership Project; Technical Specification Group Core Network and Terminals; Policy and Charging Control Signalling Flows and QoS Parameter Mapping (Release 7)" Global System for Mobile Communications. Mar. 2007.

"3rd Generation Partnership Project; Technical Specification Group Services and System Aspects; Policy and Charging Control Architecture (Release 7)" Global System for Mobile Communications. Mar. 2007.

"3rd Generation Partnership Project; Technical Specification Group Services and System Aspects; General Packet Radio Service (GPRS); Service description; Stage 2 (Release 7)" Global System for Mobile Communications. Mar. 2007.

"3rd Generation Partnership Project; Technical Specification Group Services and System Aspects; End-to end Quality of Service (QoS) Concept and Architecture (Release 6)" Global System for Mobile Communications. Sep. 2005.

Communication issued in corresponding European Patent Application No. 08757648.4, dated Feb. 17, 2011.

Office Action issued in corresponding European Patent Application No. 08757648.4, dated Jan. 26, 2012.

Office Action issued in corresponding European Patent Application No. 08757648.4, dated Dec. 6, 2012.

"3rd Generation Partnership Project; Technical Specification Group Services and System Aspects; Evolution of Policy Control and Charging, (Release 7)," Global System for Mobile Communications, 3GPP TR 23.803, V2.0.0, Sep. 2005, 30 pages.

"3rd Generation Partnership Project; Technical Specification Group Core Network and Terminals; Policy and Charging Control (PCC); Reference Points, (Release 11)," LTE, 3GPP TS 29.212 V11.10.0, Sep. 2013, 199 pages.

* cited by examiner

METHOD, SYSTEM, AND ENTITY FOR EXERCISING POLICY CONTROL

CROSS-REFERENCE TO RELATED APPLICATIONS

This application is a continuation of International Application No. PCT/CN2008/071237, filed Jun. 6, 2008, which claims the benefit of Chinese Patent Application No. 200710111366.6, filed on Jun. 15, 2007, both of which are hereby incorporated by reference in their entireties.

FIELD OF THE TECHNOLOGY

The present invention relates to a communication technology, and more particularly to a method and a system for exercising policy control, a policy and charging enforcement function (PCEF), and a policy control and charging rules function (PCRF).

BACKGROUND OF THE INVENTION

With the rapid development of wireless data services, increasingly high requirements are imposed on the quality of service (QoS) and charging of the data services. For example, in the $3^{rd}$ Generation Partnership Project (3GPP) protocol standards, the QoS and charging of the data services are controlled through a policy control method for a service flow. The policy control process for a service flow in the prior art is described below with reference to FIG. 1.

Figure 1:
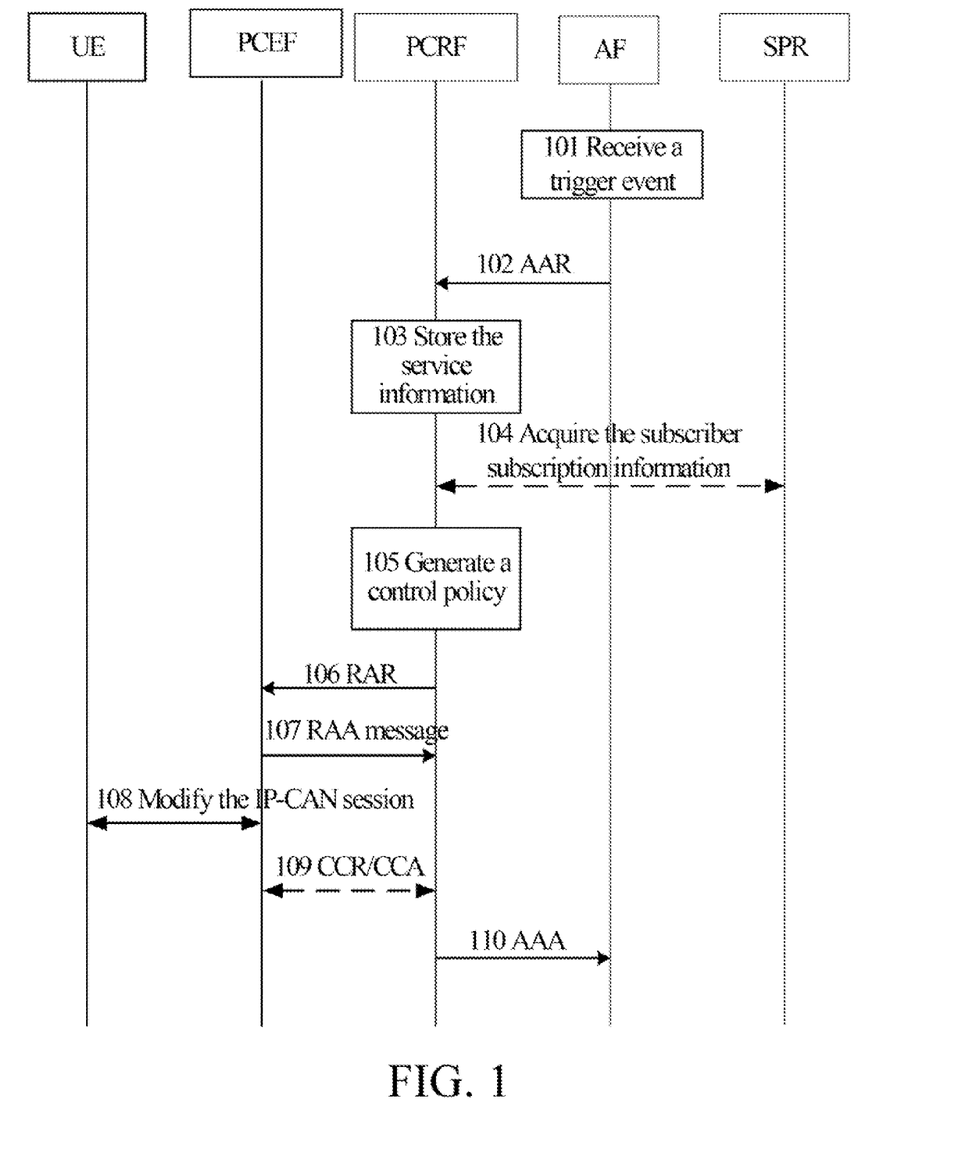
FIG. 1 is a flow chart of policy control over a service flow in the prior art.

In Step 101, an application function (AF) receives a trigger event (for example, starting of the multimedia).

In Step 102, the AF extracts information, which triggers the event, of an application service from the trigger event, and sends the service information to a policy control and charging rules function (PCRF) through a Diameter authentication-authorization-request (AAR) message.

In Step 103, after receiving the AAR message, the PCRF saves the service information in the AAR message.

In Step 104, if the PCRF does not have subscriber subscription information at this time, the PCRF requests for the subscriber subscription information from a subscription profile repository (SPR).

In Step 105, the PCRF generates a control policy according to policy contexts including an application event, service information, subscriber subscription information, operator policy, access network type, and the like.

In Step 106, the PCRF sends the control policy to a policy and charging enforcement function (PCEF) through a re-authentication-request (RAR) message.

In Step 107, the PCEF returns a re-authentication-answer (RAA) message to the PCRF.

In Step 108, the PCEF exercises a policy decision according to the control policy, for example, initiates a modification to an Internet protocol (IP)-connectivity access network (IP-CAN) session, that is, establishes an IP-CAN bearer or updates the QoS.

In Step 109, if necessary, the PCEF further needs to re-apply for a control policy from the PCRF, that is, the PCEF sends a credit-control-request (CCR) message to the PCRF, so as to request for the control policy; and then, the PCRF returns a credit-control-answer (CCA) message to the PCEF, so as to send the control policy to the PCEF.

In Step 110, the PCRF returns an authentication-authorization-answer (AAA) message to the AF.

As can be seen from the above process, in the policy control process for the service flow in the prior art, the AF sends the service information to the PCRF. The PCRF generates a control policy according to policy contexts including an application event, service information, subscriber subscription information, operator policy, access network type, and the like, and sends the generated control policy to the PCEF, and then the PCEF exercises policy control over the QoS and charging of the application service flow according to the control policy.

However, in certain application services (for example, Skype application and BT application, video on demand (VoD) application, online game application, file transfer protocol (FTP) application, and instant communication applications MSN and QQ, which use a point-to-point (P2P) technology), as no AF is provided, or AFs for such application services are generally not involved in the policy control of the network, the PCRF cannot obtain the application event and service information, and cannot generate a control policy for the service flow according to the application event and the service information. As a result, the PCEF cannot exercise policy control over the QoS, charging, and gating of service flows of the applications based on the control policy.

SUMMARY OF THE INVENTION

Accordingly, the present invention is directed to a method and a system for exercising policy control, a policy and charging enforcement function (PCEF), and a policy control and charging rules function (PCRF), so as to solve the problem that no policy control can be implemented over application service flows without an application function (AF).

In an embodiment, the present invention provides a method for exercising policy control over an application service flow, which includes the following steps.

First, a PCRF receives information about an application event sent by a PCEF.

Then, the PCRF generates a control policy of an application service flow according to the information about the application event, and delivers the control policy to the PCEF.

In an embodiment, the present invention further provides a PCEF, which includes an acquiring unit, a sending unit, a receiving unit, and an enforcement unit.

The acquiring unit is configured to acquire information about an application event.

The sending unit is configured to send the information about the application event acquired by the acquiring unit to a PCRF.

The receiving unit includes a first receiving unit configured to receive a control policy of an application service flow generated by the PCRF according to the information about the application event.

The enforcement unit is configured to control the application service flow according to the control policy received by the receiving unit.

In an embodiment, the present invention further provides a PCRF, which includes a receiving unit, a generating unit, and a sending unit.

The receiving unit is configured to receive information about an application event sent by a PCEF.

The generating unit is configured to generate a control policy according to the information about the application event received by the receiving unit.

The sending unit includes a first sending unit configured to send the control policy generated by the generating unit to the PCEF.

In an embodiment, the present invention further provides a system for exercising policy control over a service flow, which includes a PCEF and a PCRF.

The PCEF is configured to send information about an application event, receive a control policy, and control a service flow according to the control policy.

The PCRF is configured to receive the information about the application event sent by the PCEF, generate the control policy according to the information about the application event, and send the control policy to the PCEF.

According to the present invention, the PCRF acquires the information about the application event from the PCEF, so that the PCRF is enabled to acquire the information about the application event with no AF being involved. Thus, even when no AF is involved, the PCRF can still generate a control policy according to policy contexts including subscriber subscription information, operator policy, access network type, and information about the application event acquired from the PCEF, so as to exercise effective policy control over the QoS guarantee, charging and gating of the service flow, thus meeting the requirements of exercising the policy control over data applications with no AF being involved.

BRIEF DESCRIPTION OF THE DRAWINGS

The present invention will become better understood from the detailed description given herein below for illustration only, and thus are not limitative of the present invention, and wherein.

DETAILED DESCRIPTION OF THE EMBODIMENTS

In order to enable those of ordinary skill in the art to understand and implement the present invention, the embodiments of the present invention are described below with reference to the accompanying drawings.

In an embodiment, the present invention provides a method for exercising policy control over a service flow. In the method for exercising policy control over a service flow, a PCEF acquires information about an application event (for ease of description, the information about the application event is also referred to as application event information) through detecting a data packet or through other manners. The information about the application event includes an identifier of the application service, an event of the application service, filtering rules for the application service flow, QoS, and the like. Then, the acquired application event information is sent to a PCRF. Afterward, the PCRF generates a control policy according to policy contexts including the application event information, subscriber subscription information, operator policy, and/or access network type, and then sends the control policy to the PCEF, so that the PCEF exercises effective policy control over the QoS guarantee, charging and gating of the service flow according to the control policy. Thus, the control policy can be generated with no AF being involved, thus meeting the requirements of exercising the policy control over data applications with no AF being involved, that is, realizing the policy control over the QoS, charging and gating of the data applications with no AF being involved (for example, Skype application and BT application, VoD application, online game application, FTP download application, and instant communication applications MSN and QQ, which use a P2P technology). The method for exercising policy control over a service flow according to the present invention is described in Embodiment 1.

Embodiment 1

Figure 2:
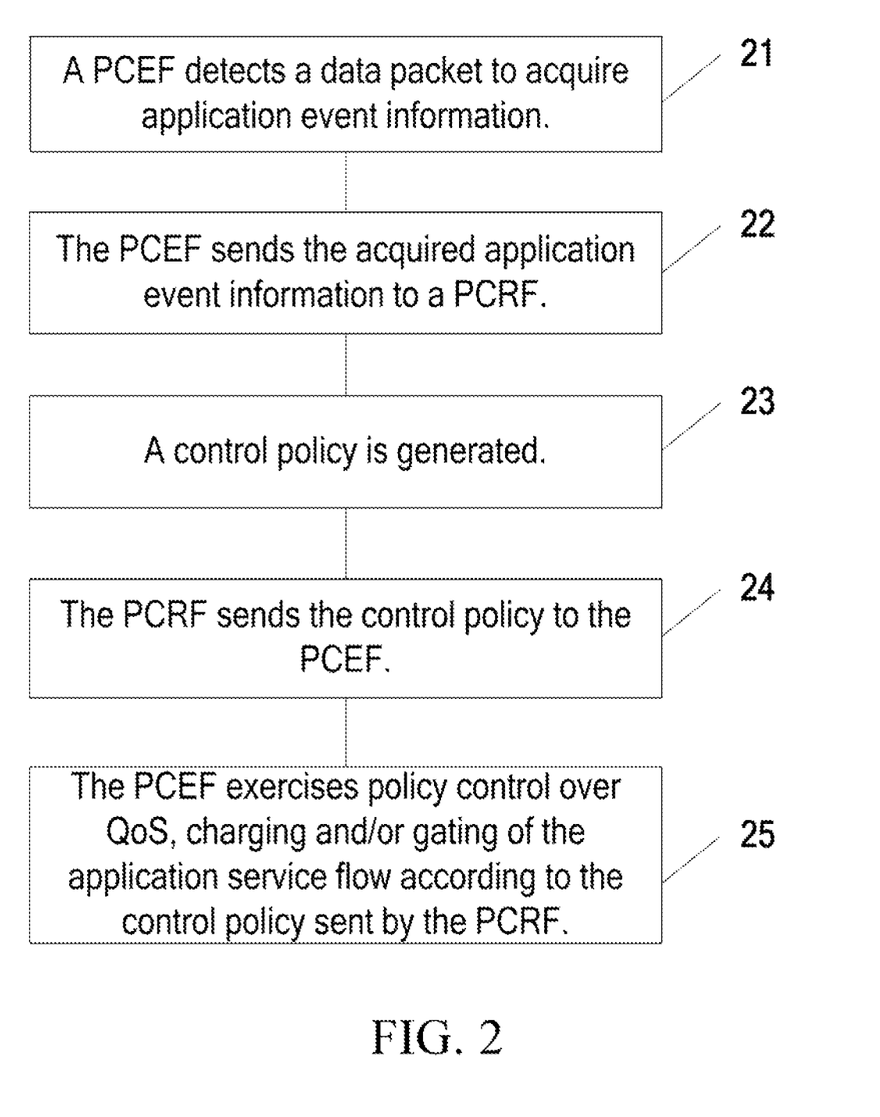
FIG. 2 is a flow chart of policy control over a service flow according to a first embodiment of the present invention.

The method for exercising policy control over a service flow is described in this embodiment with reference to FIG. 2.

In Step 21, a PCEF acquires application event information through, for example, detecting a data packet.

In Step 22, the PCEF sends the acquired application event information to a PCRF.

Step 21 and Step 22 will be described below in detail in Embodiment 2.

In Step 23, the PCRF generates a control policy according to the received application event information together with policy context information including subscriber subscription information, operator policy, and/or access network type. The control policy includes control policies over QoS control, charging, and/or gating mode of an application service flow.

When the PCRF does not have the subscriber subscription information, the PCRF may obtain the subscriber subscription information from an SPR.

The operator policy may be pre-defined in the subscriber subscription information, or configured on the PCRF, which includes information about whether supporting a certain service or not, allocable bandwidth, charging mode and the like.

In Step 24, the PCRF sends the control policy to the PCEF.

The PCRF may send the control policy to the PCEF through a CCA message or an RAR message. An example of the control policy carried in a charging-rule-definition of a charging-rule-install in the CCA or RAR message is provided as follows:

```
Charging-Rule-Definition ::=< AVP Header: 1003 >
                            { Charging-Rule-Name }
                            [ Service-Identifier ]
                            [ Rating-Group ]
                           *[ Flow-Description ]
                            [ Flow-Status ]
                            [ Authorized-QoS ]
                            [ Reporting-Level ]
                            [ Online ]
                            [ Offline ]
                            [ Metering-Method ]
                            [ Precedence ]
                            [ AF-Charging-Identifier ]
                           *[ Flows ]
                           *[ AVP ]
```

Flow-Description indicates one or more IP quintuple information of the application service flow; Flow-Status indicates control policy information about gating of the application service flow; Authorized-QoS indicates control policy information about QoS of the application service flow; Rating-Group, Reporting-Level, Online, Offline, Metering-Method and the like indicate control policy information about charging of the application service flow; and Charging-Rule-Name indicates a control policy name carrying the control policy information of the application service flow.

In Step 25, the PCEF exercises policy control over QoS, charging and/or gating of the application service flow according to the control policy sent by the PCRF.

After receiving the control policy, the PCEF exercises the policy control over the QoS, charging and/or gating of the application service flow according to the control policy. For example, the PCEF can filer the application packet according to the gating information in the control policy, and exercise gating control (for example, forwarding or discarding) over the packets matched with the application service flow according to an instruction (Disable, Enable, and the like) given by the gating control policy; PCEF can exercise QoS control according to the QoS control policy in the control policy to update an IP-CAN session, for example, update QoS parameters of the IP-CAN session, establish or delete an IP-CAN bearer; and the PCEF can exercise the charging control, for example, traffic or duration based charging and online or offline charging, according to the charging control policy in the control policy.

Embodiment 2

Step 21 and Step 22 have described a process of sending the application event information to the PCRF, and the process for the PCEF to send the application event information to the PCRF is described in detail in this embodiment.

In Step 21, the PCEF may obtain the application event information through detecting a data packet. In an embodiment of the present invention, the PCEF may perform application event detection according to an application event detection configuration and/or application event subscription sent by the PCRF, so as to acquire the application event information. The application event detection configuration are preset in the PCEF, and the specific content thereof is similar to the content of the application event subscription, which may be obtained with reference to the following description about the application event subscription. The application event subscription is subscribed by the PCRF.

The PCEF may start the detection of the data packet when the IP-CAN session is established or any IP-CAN bearer in the IP-CAN session is established, so as to detect the data packet according to the application event detection configuration, thus acquiring the application event information.

The PCEF may further detect the data packet according to the application event subscription sent by the PCRF to acquire the application event information. The application event subscription includes: an identifier of application service, including an identifier of BT application, an identifier of FTP application, an identifier of real time streaming protocol (RTSP) application, an identifier of online game application, and the like; an event of application service, including starting, stopping, and modifying of an application service, and the like; and filtering rules of application service, in which the filtering rule condition may be an IP quintuple, or other high-level (for example, Layer 7 or application layer) packet detection parameter protocols and the like.

When the PCEF detects the data packet according to the application event subscribed by the PCRF to acquire the application event information, the PCRF needs to subscribe the application event on the PCEF first. The PCRF may deliver the application event subscription to the PCEF at an appropriate situation (for example, when the IP-CAN session is established, or when the operator policy is changed after the IP-CAN session is established), so that the PCEF detects the data packet according to the application event subscription. Currently, a Gx interface does not support the subscription of an application event yet, so that the capability of the Gx interface needs to be extended in order to support such a function. In terms of the specific implementations, the PCRF may extend the CCA message or RAR message, and deliver the application event subscription to the PCEF by using the extended Diameter CCA message command or RAR command. The application event subscription may be carried by one Diameter AVP, and an example of a Diameter AVP (i.e., an application event subscription cell) carrying an application event subscription is provided as follows:

```
App-Event ::= < AVP Header: xxxx >
                 { App-ID }
                 *[ App-Event-Trigger ]
                 *[ App-Filter-Rule ]
                 [Operate-Action]
                 [Authorized-QoS]
```

App-Event AVP (AVP code XXXX, applicable to all the access types) is of a grouped type, and configured to indicate application event extension information.

App-ID AVP is of an enumerated type, indicates an application type, and may be one of or a combination of the following values:
 0 indicates a web application;
 1 indicates an FTP application;
 2 indicates a streaming media application;
 3 indicates an online game application;
 4 indicates a BT application;
 5 indicates a Skype application;
 6 indicates an MSN application; and
 7 indicates a QQ application.

App-Event-Trigger AVP is mandatory and of an enumerated type, indicates an application trigger event, and may be one of or a combination of the following values:
 0 indicates starting an application;
 1 indicates stopping an application;
 2 indicates modifying an application; and
 3 indicates the existence of an application.

App-Filter-Rule AVP indicates a filtering rule condition, which may be IP quintuple information, and may also contain other high-level packet detection parameters. An example of the filtering rule condition is demonstrated as follows.

The IP quintuple includes a source IP address, a destination IP address, a source port number, a destination port number, and a protocol number, in which the IP address may be a range, and indicated with a mask (for example, a length of the mask is 8, 16, or 24), and the port number may be a certain range (for example, 551-559).

The extended Layer-7 parsing includes a Layer-7 protocol type (HTTP, WAP2.0, RTSP, and FTP) and uniform resource locator (URL) information.

Operate-Action AVP is of an enumerated type and indicates an operation type of the App-Event, which is only used in a message sent from the PCRF to the PCEF, and may have the following values:

0 indicates installing the application event subscription, so as to subscribe the application event information;

1 indicates deleting the application event subscription, so as to cancel the subscription of the application event information; and 2 indicates deleting all the previously installed application event subscriptions, so as to cancel all the previous subscriptions of the application event information.

Authorized-QoS AVP indicates QoS information, which is only used when the PCEF sends the application event information to the PCRF. Herein, the Authorized-QoS indicates the detected QoS information of the application service flow defined as follows:

```
Authorized-QoS ::= <  AVP Header: 1016 >
                    [ QoS-Class-Identifier ]
                    [ Maximum-Requested-Bandwidth-UL ]
                    [ Maximum-Requested-Bandwidth-DL ]
                    [ Guaranteed-Bitrate-UL ]
                    [ Guaranteed-Bitrate-DL ]
                    [ Bearer-Identifier ]
```

The above application event subscription cell may be sent to the PCEF as a separate message, and may also be configured in a CCA or RAR message and then sent to the PCEF by the PCRF. After receiving the CCA or RAR message carrying the application event subscription cell, the PCEF installs or deletes the application event subscription corresponding to the App-ID according to the parameter Operate-Action AVP in the application event subscription cell. For example, when the value of the Operate-Action is 0, it indicates installing the application event subscription, so as to subscribe the application event information; when the value of the Operate-Action is 1, it indicates deleting the application event subscription, so as to cancel the subscription of the application event information corresponding to the application event subscription; and when the value of the Operate-Action is 2, it indicates deleting all the previously installed application event subscriptions, so as to cancel all the subscriptions of the application event information.

An example of the CCA message carrying the application event subscription cell is shown as follows:

```
<CC-Answer> ::=    < Diameter Header: 272, PXY >
                   < Session-Id >
                   *[ App-Event ]
                   ......
                   *[ AVP ]
```

In order to acquire the application event information, the PCEF is required to detect an IP data packet passing through the PCEF, parse the packet, and realize service awareness according to information parsed from the packet, so as to acquire the application event information. When detecting the packet, the PCEF may perform application event detection according to the preset application event detection configuration and/or the application event subscription sent from the PCRF.

Once detecting an application event, the PCEF reports information about the application event to the PCRF. In terms of the specific implementation, the PCEF may report the detected application event information through a Diameter CCR or RAA message, and the message carries an App-Event AVP configured to indicate the detected application event information. The App-ID indicates a specific application type (FTP, BT, and the like) that is detected, App-Event-Trigger indicates a specific application event that is triggered, and App-Filter-Rule indicates a filtering rule for the application service flow of the triggered application event. If necessary, the App-Event AVP may further carry an Authorized-QoS configured to indicate the detected QoS information of the application service flow.

The policy control process is described below through Embodiment 3 to Embodiment 5 according to the process of acquiring the application event information, in which the policy control process of acquiring the application event information according to the application event subscription is described in Embodiment 3, and the policy control process according to the preset application event detection configuration is described in Embodiment 4 and Embodiment 5.

Embodiment 3

Figure 3:
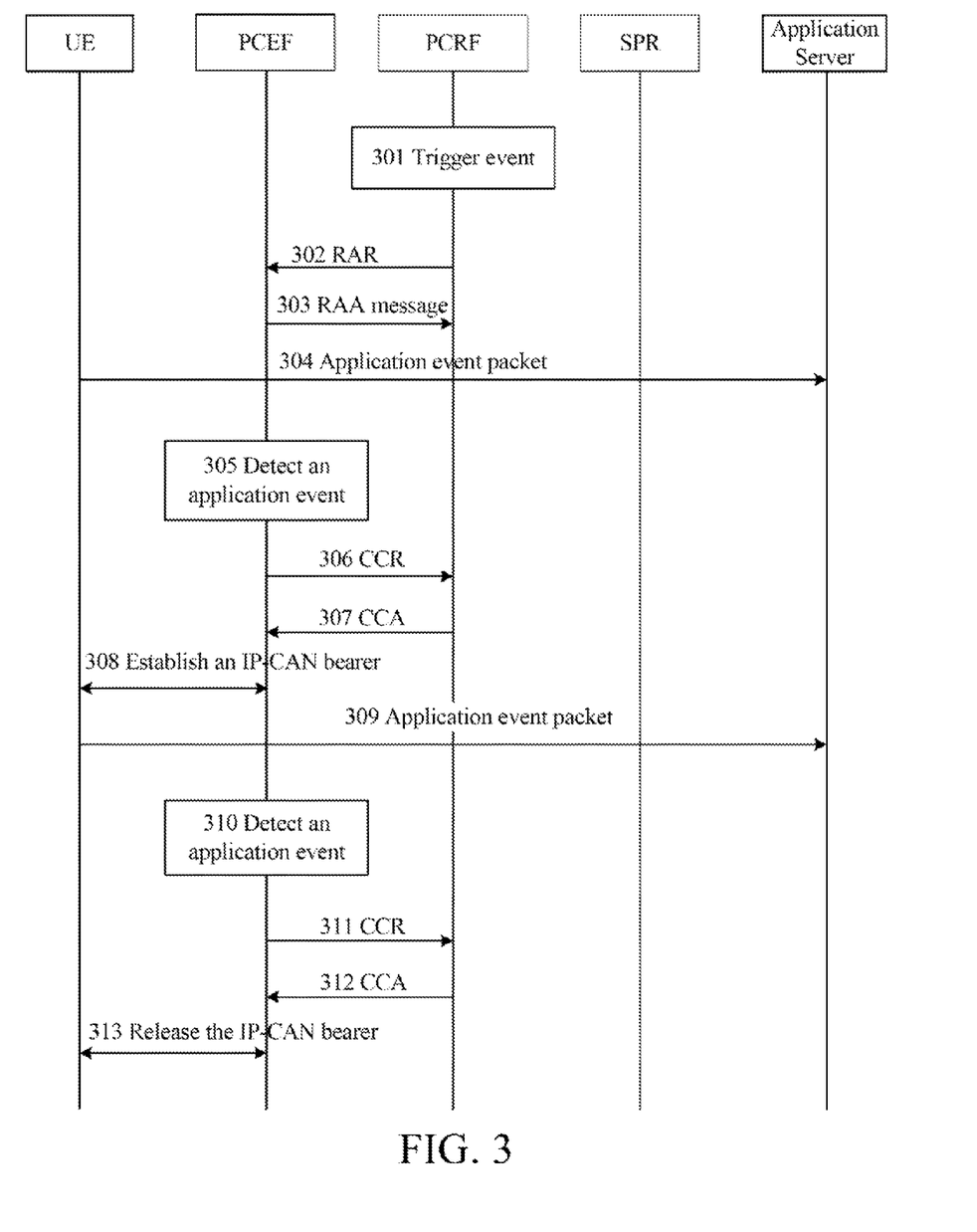
FIG. 3 is a flow chart of policy control over a service flow according to a third embodiment of the present invention.

The policy control process based on the application event subscription is described in this embodiment with reference to FIG. 3.

In Step 301, the PCRF receives an event trigger, for example, finding that the IP-CAN session is established or the operator policy is changed, and in this case, the PCRF is required to subscribe the application event from the PCEF.

In Step 302, the PCRF sends an RAR message to the PCEF, so as to subscribe the application event. The RAR message includes an application event subscription cell: App-Event AVP. In the application event subscription cell, the App-ID is 2, indicating that the application event is a streaming media service; the App-Event-Trigger is 0 and 1, indicating that both the starting and stopping of the streaming media are taken as the trigger events; the App-Filter-Rule carries a specific application filtering condition (for example: source IP: 10.0.0.1, destination IP: 10.1.0.1, source port: 1039, destination port: 554, protocol: TCP; and Layer-7 URL: SETUP, rtsp://10.1.0.1:554/avsync.3gp/streamid=0); and Operate-Action is 0, indicating that the operation type is installing the application event subscription.

In Step 303, after receiving the RAR message, the PCEF installs the application event subscription to detect a corresponding application event, and then sends an RAA message to the PCRF.

In Step 304, a user equipment (UE) communicates with an application server via the PCEF, for example, the UE sends an application event packet (SETUP message of the RTSP service flow) to the application server via the PCEF.

In Step 305, when the packet passes through the PCEF, the PCEF detects the application event according to the application event subscription, and obtains information about the application event.

In Step 306, the PCEF sets the application event information in an application event information cell, sets the application event information cell in a Diameter CCR message, and then sends the CCR message to the PCRF. The application event information cell (App-Event AVP) carries the application event information, in which App-ID is 2, indicating that the application service is a streaming media service; App-Event-Trigger is 0, indicating that an event of starting the streaming media is detected; App-Filter-Rule carries a specific IP quintuple filtering condition for the streaming media application service flow; and Authorized-QoS is configured to indicate detected QoS information of the application service flow.

In Step 307, the PCRF implements a policy decision according to the received application event information together with the conditions of bandwidth already occupied by the current UE and policies defined by an operator, and so on. When the PCRF discovers that the current UE does not have any other real time service or a total bandwidth of a guaranteed bit-rate (GBR) for the current existing real time service does not exceed the maximum GBR bandwidth threshold, the PCRF may allocate 1 M GBR bandwidth for the streaming media service, decide to accept the streaming media service, generate a control policy carrying QoS and charging control policies for the streaming media service, and send the control policy to the PCEF through a CCA message. The control policy information of the RTSP service flow is indicated by Charging-Rule-Definition AVP, and the AVP mainly contains the following information:

Flow-Description AVP, indicating IP quintuple information of the RTSP application service flow;

Authorized-QoS AVP, indicating QoS control policy information of the RTSP application service flow, in which a value of the QoS-Class-Identifier is a QCI of the real time service; and Guaranteed-Bitrate-UL/DL is 1 M;

Metering-Method AVP, indicating charging control policy information of the RTSP application service flow, and the specific value thereof is VOLUME (1) indicating traffic based charging; and Charging-Rule-Name, indicating a control policy name carrying the control policy information of the RTSP application service flow, which is assumed as RTSP-Rule here.

In Step 308, the PCEF exercises the policy control according to the QoS and charging control policies of the RTSP application service flow in the control policy delivered by the PCRF, establishes an IP-CAN bearer of 1 M GBR bandwidth to bear the RTSP service flow, and meanwhile implements a corresponding charging policy.

In Step 309, the UE communicates with the application server via the PCEF, for example, the UE sends an application event packet (TEARDOWN message of RTSP) to the application server.

In Step 310, the PCEF detects an application event of stopping the streaming media service according to the application event subscription.

In Step 311, the PCEF sends a CCR message to the PCRF to report the detected application event information, in which the CCR message includes an App-Event AVP.

The App-Event AVP carries the detected application event information. The application event information includes: App-ID being 2, indicating that the application service is a streaming media service; App-Event-Trigger being 1, indicating that an application event of stopping the streaming media application is detected; and App-Filter-Rule carrying a specific IP quintuple filtering condition for the streaming media application service flow.

In Step 312, the PCRF discovers that the streaming media application is stopped according to the received application event information, and the control policy corresponding to the RTSP service flow needs to be deleted, so as to delete corresponding QoS and charging control policies. The PCRF sends a CCA message to instruct the PCEF to delete the control policy corresponding to the RTSP service flow. The message carries a Charging-Rule-Remove AVP, in which the Charging-Rule-Name is RTSP-Rule, indicating that the control policy corresponding to the RTSP application service flow shall be deleted.

In Step 313, when deleting the control policy according to the instruction of the CCA message, the PCEF discovers that no other control policy is bound to the corresponding IP-CAN bearer, so the PCEF determines that the IP-CAN bearer needs to be released, and initiates a process for releasing the IP-CAN bearer, so as to reclaim corresponding resources.

Embodiment 4

Figure 4:
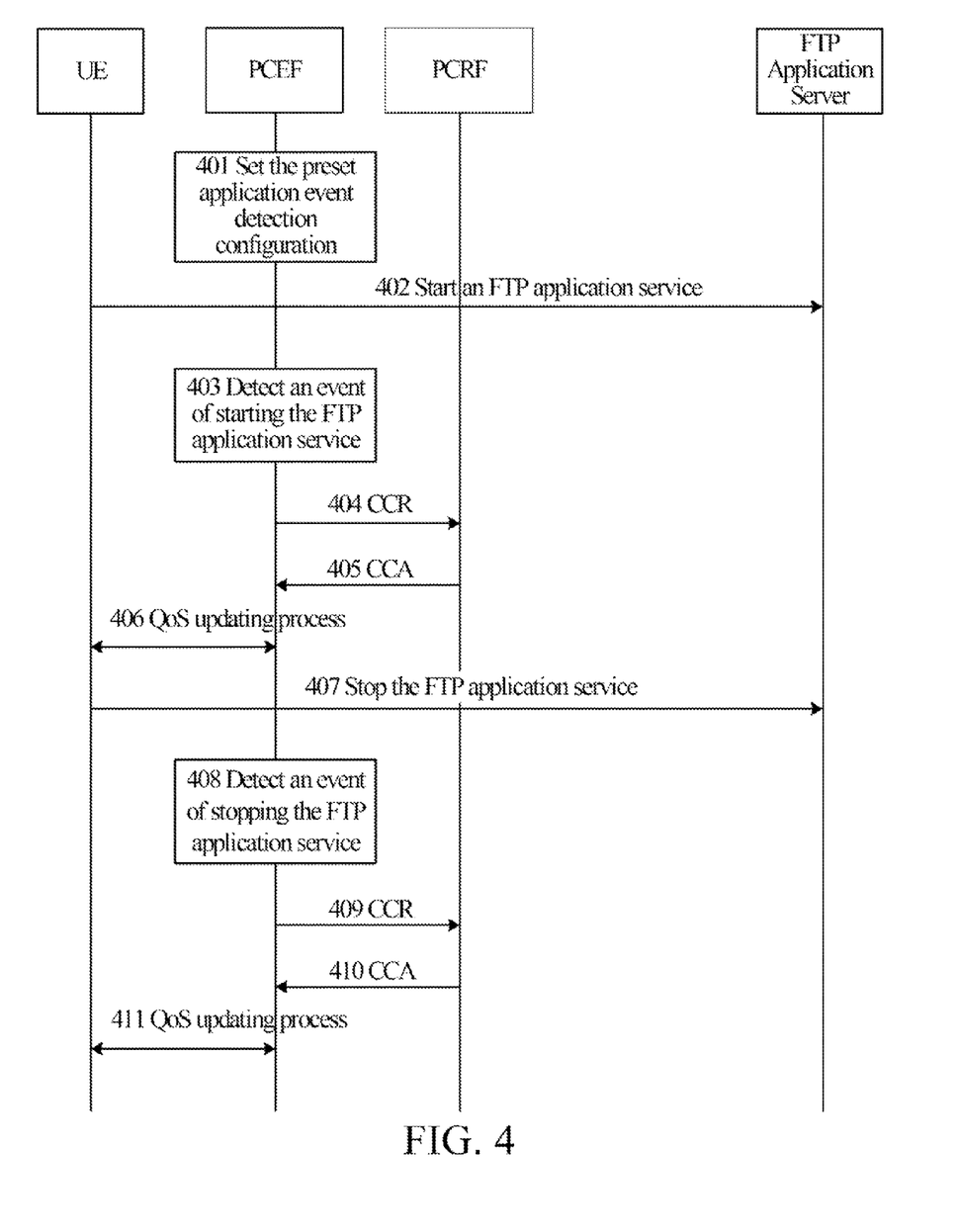
FIG. 4 is a flow chart of policy control over a service flow according to a fourth embodiment of the present invention.

In this embodiment, it is assumed that an FTP application is executed between a UE and an FTP application server, and a policy control process according to the preset application event detection configuration is described below with reference to FIG. 4.

In Step 401, the PCEF sets the preset application event detection configuration.

In Step 402, the UE communicates with the FTP application server via the PCEF, and during the communication, a data packet (for example, a packet for starting an FTP application service) is transmitted there-between.

In Step 403, the PCEF detects the transmitted data packet according to the preset application event detection configuration, and detects an event of starting an FTP application service, so as to acquire corresponding application event information.

In Step 404, the PCEF sends a CCR message to the PCRF to report the detected application event information. The CCR message includes a cell: App-Event AVP. The App-Event AVP includes: App-ID being 1, indicating that the application service is FTP; App-Event-Trigger being 0, indicating that an event of starting an FTP application is detected; App-Filter-Rule carrying a specific IP quintuple filtering condition for the FTP application service flow; and Authorized-QoS configured to indicate detected QoS information of the detected FTP application service flow.

In Step 405, the PCRF decides to increase an online available bandwidth by 1 M bps according to the received application event information together with policy context information such as that the current duration is idle time of the network, so as to accelerate the FTP download. The PCRF derives a control policy carrying a QoS control policy of the FTP application service flow according to the policy decision, and delivers the control policy to the PCEF through a CCA message. The control policy information of the FTP service flow is indicated by Charging-Rule-Definition AVP, and the AVP mainly includes the following information:

Flow-Description AVP, indicating one or more IP quintuple information of the FTP application service flow;

Authorized-QoS AVP, indicating QoS control policy information of the FTP application service flow, in which the value of the QoS-Class-Identifier is a QCI of the FTP service; and Maximum-Requested-Bandwidth-UL/DL is 1M; and Charging-Rule-Name, indicating a control policy name carrying control policy information of the FTP application service flow, which is assumed as FTP-Rule.

In Step 406, the PCEF exercises QoS policy control according to the QoS control policy of the FTP application service flow in the delivered control policy, initiates a QoS updating process, and increases the online bandwidth by 1 M bps.

In Step 407, the UE sends a data packet (for example, a packet for stopping the FTP service application) to the FTP application server.

In Step 408, the PCEF detects the data packet according to the preset application event detection configuration, and detects that an event of stopping the FTP application service, and acquires application event information (information related to the event of stopping the FTP application service).

In Step 409, the PCEF sends the CCR message to the PCRF to report the application event information. The CCR message includes a cell: App-Event AVP. The App-Event AVP includes: App-ID being 1, indicating the application service is FTP; App-Event-Trigger being 1, indicating that an event of stopping the FTP is detected; and App-Filter-Rule carrying a specific IP quintuple filtering condition for the FTP application service flow.

In Step 410, the PCRF discovers that the FTP application is stopped according to the received application event information, and the control policy corresponding to the FTP service flow needs to be deleted, so as to delete the corresponding QoS control policy. The PCRF sends a CCA message to instruct the PCEF to delete the control policy corresponding to the FTP service flow. The message carries a Charging-Rule-Remove AVP, in which Charging-Rule-Name is FTP-Rule, indicating that the control policy corresponding to the FTP application service flow shall be deleted.

In Step 411, the PCEF deletes the control policy according to the instruction of the CCA message, updates QoS parameters of the IP-CAN bearer to which the control policy corresponding to the FTP application service flow is bound, and reduces the bandwidth of the IP-CAN bearer by 1 M bps.

Embodiment 5

Figure 5:
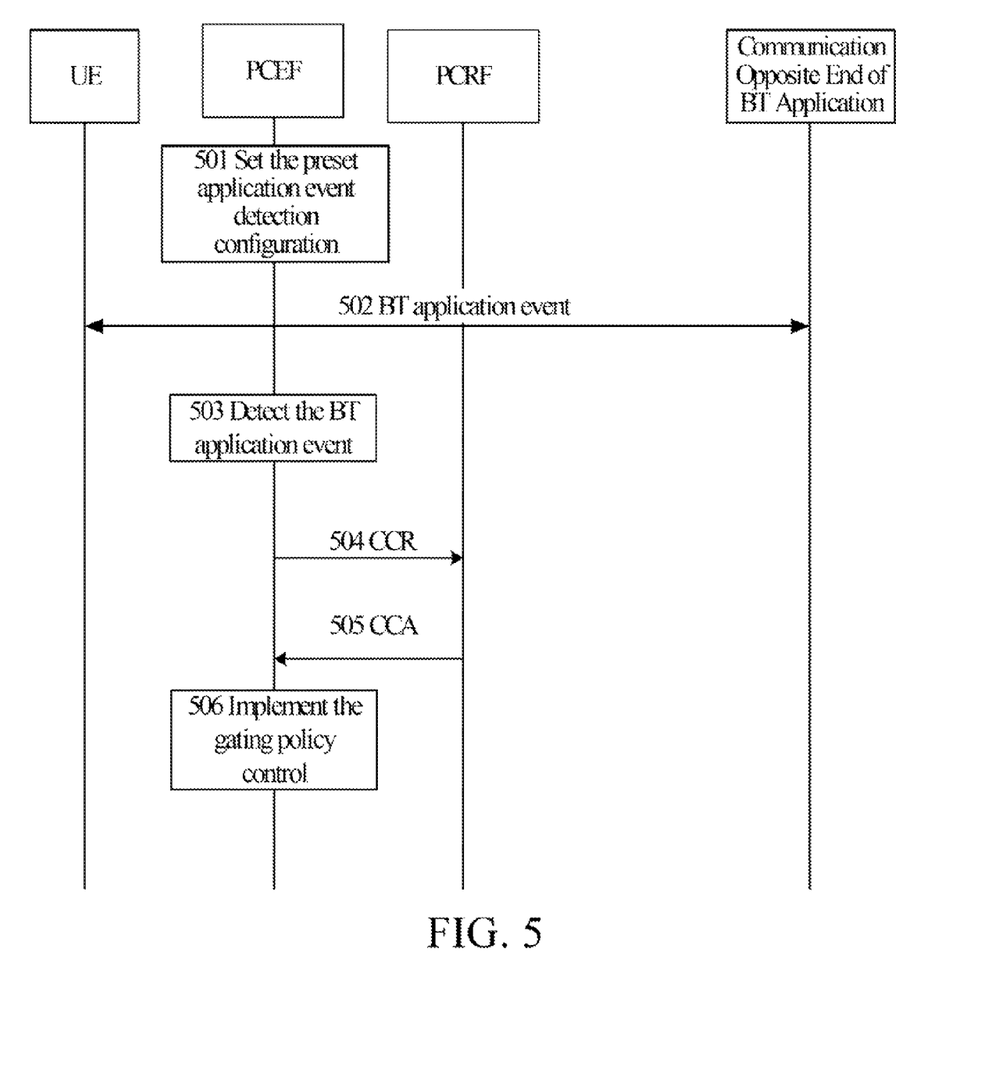
FIG. 5 is a flow chart of policy control over a service flow according to a fifth embodiment of the present invention.

In this embodiment, it is assumed that a UE communicates with a communication opposite end of a BT application, and a policy control process according to a preset application event detection configuration is described below with reference to FIG. 5.

In Step 501, the PCEF sets the preset application event detection configuration, so as to detect a BT application event.

In Step 502, the UE starts a BT service application via the PCEF, and communicates with the communication opposite end of the BT application (for example, a data packets is transmitted there-between).

In Step 503, the PCEF detects the data packet according to the preset application event detection configuration, and detects the BT application event, so as to acquire application event information.

In Step 504, the PCEF sends a CCR message to the PCRF to report the detected application event information to the PCRF. The CCR message includes: App-Event AVP. The App-Event AVP includes: App-ID being 4, indicating a BT application; App-Event-Trigger being 0, indicating that an event of starting the BT application is detected; and App-Filter-Rule carrying a specific IP quintuple filtering condition for the BT application service flow.

In Step 505, the PCRF implements a policy decision according to the received application event information together with policy context information including subscriber subscription information, operator policy and the like, and discovers that the UE is using an FTP high-speed service, and cannot perform the BT download at the same time. Thus, the PCRF derives a control policy carrying a gating control policy of the BT application service flow according to the policy decision, and delivers the control policy to the PCEF through a CCA message. The gating control policy information of the BT service flow is indicated by Charging-Rule-Definition AVP, and the AVP mainly includes the following information:

Flow-Description AVP, indicating one or more IP quintuple information of the BT application service flow; and Flow-Status, indicating the gating control policy information of the BT application service flow, and the value thereof is "DISABLED" here, which indicates that the BT application service flow is not allowed to pass there through.

In Step 506, the PCEF exercises the gating policy control according to the gating control policy of the BT application service flow in the delivered control policy, so as to prohibit the BT application service flow from passing there through.

Embodiment 6

Figure 6:
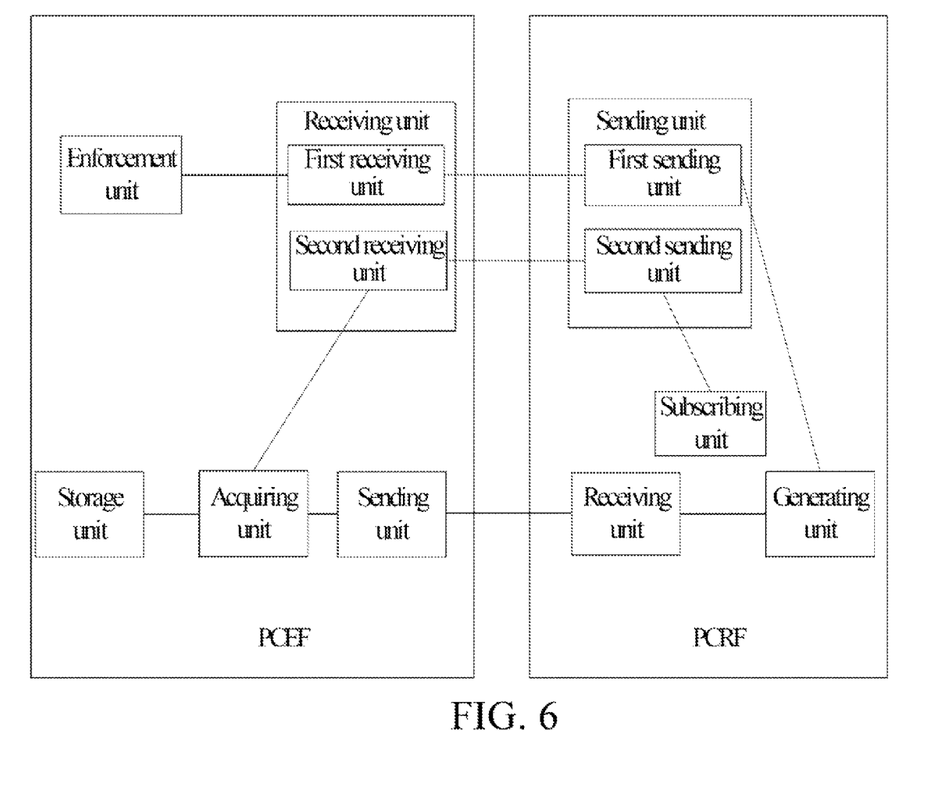
FIG. 6 shows a policy control system according to a sixth embodiment of the present invention.

Referring to FIG. 6, in this embodiment, a system for exercising policy control over a service flow according to the present invention is described, which includes a PCEF and a PCRF.

The PCEF sends application event information to the PCRF, receives a control policy sent by the PCRF, and exercises policy control over a service flow according to the control policy. The application event information may be acquired through detecting a data packet, or through other manners.

The PCEF includes a receiving unit, an acquiring unit, a sending unit, an enforcement unit, and a storage unit. The receiving unit includes: a first receiving unit, configured to receive the control policy of the application service flow generated by the PCRF according to the application event information; and a second receiving unit, configured to receive a CCA message or RAR message carrying an application event subscription sent by the PCRF. The acquiring unit is configured to acquire the application event information. The sending unit is configured to send the application event information acquired by the acquiring unit to the PCRF, and further includes a setting unit (not shown) configured to set the application event information in an application event information cell and set the application event information cell in a CCR message or RAR message. The enforcement unit is configured to exercise policy control over the service flow according to the control policy. The storage unit is configured to storage a preset application event detection configuration.

The acquiring unit includes: a first detecting unit, configured to detect a received data packet according to the preset application event detection configuration, so as to acquire the application event information; and a second detecting unit, configured to detect a data packet according to the application event subscription, so as to acquire the application event information.

The PCRF receives the application event information sent from the PCEF, generates the control policy according to the application event information, and delivers the control policy to the PCEF.

The PCRF includes a receiving unit, a subscribing unit, a generating unit, and a sending unit. The receiving unit is configured to receive the application event information sent by the PCEF. The subscribing unit is configured to generate the application event subscription when an IP-CAN session is established or when an operator policy is changed after the IP-CAN session is established. The generating unit is configured to generate a control policy according to the application event information received by the receiving unit. The sending unit further includes: a first sending unit, configured to send the control policy generated by the generating unit to the PCEF; and a second sending unit, configured to send the application event subscription generated by the subscribing unit to the PCEF. The second sending unit further includes a setting unit (not shown) configured to set the application event subscription in an application event subscription cell and set the application event subscription cell in a CCA message or RAR message.

According to the present invention, the PCEF acquires the application event information and sends the application event information to the PCRF. Thus, even when no AF is involved, the PCRF can still generate a control policy, so as to exercise policy control over the QoS guarantee and charging rule of the service flow, thus meeting the requirements of exercising the policy control over data applications with no AF being involved.

The above descriptions are merely preferred embodiments of the present invention, but not intended to limit the present invention. Any modification, equivalent replacement, and improvement made without departing from the principles of the present invention shall fall within the scope of the present invention.

What is claimed is:

1. A method for exercising policy control over data flow of an application service, comprising:

subscribing, by a Policy and Charging Rule Function PCRF, to an application event, where the subscribing to the application event comprising: generating a Re-Authorization Request (RAR) message or a first Credit Control Answer (CCA) message that includes an identifier of the application service and an event of the application service and sending the RAR message or the first CCA message to a Policy and Charging Enforcement Function (PCEF);

detecting, by the PCEF, the application event based on the identifier of the application service and the event of the application service received in the RAR message or the first CCA message;

generating, by the PCEF, a Diameter Credit Control Request (CCR) message wherein the Diameter CCR message includes information on the detected application event comprising the identifier of the application service and the event of the application service;

sending, by the PCEF, the Diameter CCR message to the PCRF;

generating, by the PCRF, a control policy of the data flow of the application service according to the information on the detected application event in response to receiving the Diameter CCR message; and delivering, by the PCRF, the control policy to the PCEF through a second CCA message, wherein the application service does not include involvement of an Application Function.

2. The method according to claim 1, wherein the RAR message or the first CCA message comprising filtering rules of the application service.

3. The method according to claim 1, wherein the information on the detected application event further comprising at least one of the following: filtering rules of the application service and Quality of Service (QoS) information.

4. The method according to claim 1, wherein after delivering the control policy to the PCEF, the method further comprising: controlling, by the PCEF, the data flow of the application service according to the control policy.

5. The method according to claim 1, wherein the RAR message or the first CCA message further includes an operation type and the PCEF subscribes or deletes subscription according to the operation type.

6. The method according to claim 1, wherein the event of the application service comprises at least one of the following: the event of the application start and the event of the application stop.

7. The method according to claim 1, wherein the Diameter CCR message includes an App-Event AVP, wherein the App-Event AVP carries the information on the detected application event.

* * * * *